(12) United States Patent
Ene et al.

(10) Patent No.: US 12,333,544 B2
(45) Date of Patent: Jun. 17, 2025

(54) METHODS FOR ACCESS POINT SYSTEMS AND PAYMENT SYSTEMS THEREFOR

(71) Applicant: Supertab AG, Steinhausen (CH)

(72) Inventors: Cosmin-Gabriel Ene, Munich (DE); Achim Luft, Braunschweig (DE); Martin Hans, Bad Salzdetfurth (DE); Tom Nemec, Schwabisch Gmund (DE)

(73) Assignee: SUPERTAB AG, Steinhausen (CH)

( * ) Notice: Subject to any disclaimer, the term of this patent is extended or adjusted under 35 U.S.C. 154(b) by 273 days.

(21) Appl. No.: 16/959,862

(22) PCT Filed: Jan. 2, 2019

(86) PCT No.: PCT/EP2019/050048
§ 371 (c)(1),
(2) Date: Jul. 2, 2020

(87) PCT Pub. No.: WO2019/134920
PCT Pub. Date: Jul. 11, 2019

(65) Prior Publication Data
US 2021/0090087 A1    Mar. 25, 2021

Related U.S. Application Data

(60) Provisional application No. 62/612,897, filed on Jan. 2, 2018.

(51) Int. Cl.
G06Q 20/40     (2012.01)
G06Q 20/32     (2012.01)
H04W 88/08    (2009.01)

(52) U.S. Cl.
CPC ... *G06Q 20/40155* (2020.05); *G06Q 20/3223* (2013.01); *G06Q 20/3224* (2013.01);
(Continued)

(58) Field of Classification Search
None
See application file for complete search history.

(56) References Cited

U.S. PATENT DOCUMENTS 8,498,939 B1 * 7/2013 Gupta ............... G06Q 30/0637
705/40
8,561,168 B2 * 10/2013 Ishidoshiro ........... H04W 12/80
726/13
(Continued)

FOREIGN PATENT DOCUMENTS

WO    WO-2006111569 A1 * 10/2006 ............. H04L 29/10
WO         2014017742 A1     1/2014

OTHER PUBLICATIONS

Merino, A. S., "Secure Authentication System for Public WLAN Roaming", Mobile Networks and Applications 10.3: 355-370. New York: Springer Nature B.V. (Jan. 2005) (Year: 2005).*
(Continued)

*Primary Examiner* — Clay C Lee

(57) ABSTRACT

Methods for access points and corresponding payment systems which facilitate access to a data network by a user device for payments of very small monetary amounts in an access now and pay later arrangement. The method for such a payment system for at least one access point or access point server relies on an identifier associated with a mobile device for recording such identifier; receiving and confirming direct debit orders from the associated mobile device for access to a data network; and for storing the direct debit orders. Such payment system method monitors the total of the debit amounts in relation to the identifier and requests a user of the mobile device to register and settle at least a portion of the total amount after a predetermined time interval and/or on exceeding a predetermined total debit amount, in order to settle at least part of such total debit amount. In accordance with such requests, the access points
(Continued)

may provide the user device with limited access to the data network for registering and settling with the payment system. Such limited access may comprise at least one of limited access to at least one network address of the payment system, limited duration of access, and limited transmission rate.

12 Claims, 6 Drawing Sheets

(52) U.S. Cl.
CPC ....... *G06Q 20/325* (2013.01); *G06Q 20/4016* (2013.01); *H04W 88/08* (2013.01)

(56) References Cited

U.S. PATENT DOCUMENTS

| | | | |
|---|---|---|---|
| 9,264,554 B2* | 2/2016 | Anderson | H04M 15/09 |
| 9,392,628 B2 | 7/2016 | Zisimopoulos et al. | |
| 10,601,832 B1* | 3/2020 | Pajjuri | H04L 63/10 |
| 2005/0122921 A1* | 6/2005 | Seo | H04W 48/16 |
| | | | 370/310 |
| 2010/0099410 A1* | 4/2010 | Sweeney | H04W 4/029 |
| | | | 455/435.1 |
| 2012/0210401 A1* | 8/2012 | Pepin | H04W 12/069 |
| | | | 726/4 |
| 2013/0167196 A1* | 6/2013 | Spencer | H04L 67/303 |
| | | | 370/254 |
| 2013/0212023 A1 | 8/2013 | Ross et al. | |
| 2014/0007200 A1* | 1/2014 | Zisimopoulos | H04W 4/00 |
| | | | 370/328 |
| 2015/0085746 A1* | 3/2015 | Somayazulu | H04W 48/08 |
| | | | 370/328 |
| 2015/0161585 A1* | 6/2015 | Huster | G06Q 20/3224 |
| | | | 705/44 |
| 2019/0104411 A1* | 4/2019 | Hotchkiss | H04L 63/107 |
| 2019/0104429 A1* | 4/2019 | Brisebois | H04W 24/02 |
| 2019/0311430 A1* | 10/2019 | Raleigh | G06Q 40/03 |

OTHER PUBLICATIONS

The Internaional Search Report and Written Opinion, mailed on Mar. 13, 2019, in the corresponding PCT Appl. No. PCT/EP2019/050048.

The Communication pursuant to Article 94(3) EPC, mailed on Mar. 25, 2022, in the related European Appl. No. 19 700 246.2.

* cited by examiner

METHODS FOR ACCESS POINT SYSTEMS AND PAYMENT SYSTEMS THEREFOR

CROSS-REFERENCE TO RELATED APPLICATIONS

This application is a National Stage Application of PCT/EP2019/050048 filed Jan. 2, 2019, which claims priority from U.S. Provisional Patent Application No. 62/612,897, filed on Jan. 2, 2018. The priority of both said PCT and U.S. Provisional Patent Application are claimed. Each of prior mentioned applications is hereby incorporated by reference herein in its entirety.

FIELD OF THE INVENTION

This application is directed generally to access points for enabling user devices to connect to a data network pursuant to a payment arrangement, and specifically to an access point and payment authorization systems and methods that enable user devices to connect to a data network subject to the payment arrangement of deferred payment in substantial absence of registration or login to the payment system by a user associated with the user device.

BACKGROUND

Wi-Fi hotspots are devices representing a type of access point in which users are offered internet access via wireless local area networks ("WLAN"). Public free Wi-Fi is basically operated by commercial providers with extensive infrastructure as router with integrated authentication, authorization and accounting ("AAA") server functionality and webserver in order to offer customers a portal page for authentication, authorization and accounting. There exist several business models for Wi-Fi-hotspots depending on the business entity that is offering the internet access and to whom. For example, a coffee shop may offer its customers free Wi-Fi internet access for their convenience. The coffee shop may include passwords on receipts or notes cards on its tables. Certain internet providers offer to their closed group of subscribers mobile internet access via Wi-Fi hotspots at public venues, such as airports.

Other examples of Wi-Fi hotspots employ a so-called landing platform service. In particular, in operation of such a service, the Wi-Fi hotspot forwards all webpage requests of the users to a network address offering a portal page. In the portal page, the users can register for the service, and existing registered users can login with their credentials. Usually there is also a method to pay for the internet access implemented on the portal page. However, most owner of consumer WLAN access points do not have sufficient infrastructure to offer Wi-Fi internet access to unregistered or unknown individuals.

Further conventional enterprise systems employed in corporate networks use separate routers and WLAN access points. The routers provide WLAN security, typically using standards-compliant protocols, such as the IEEE 802.1X protocol. An authentication server authenticates a user device's request for login, and authorizes a network switch or WLAN access point, to grant access. However, such enterprise systems do not address providing internet access to unauthorized user devices, whether for a fee or otherwise.

However, the inventors of the present disclosure have recognized advantageous commerce opportunities exist for enabling user devices to connect to a data network, such as the internet, using public Wi-Fi or other systems subject to a connection fee in combination with an easy to use system for deferred payment that does not require a user associated with the user device to register or login to a payment system. No conventional solutions are known for combining a Wi-Fi hotspot with a convenient access now, play later, payment system. In the case of the IEEE 802.1X protocol there is no internet protocol ("IP") routing before authentication, since the authentication protocol itself is below IP processing level.

Further, conventional hotspot servers used in local networks of, for example, hotels or conference centers, effectively operate as switches. Thus, if the corresponding hotspot server software is running on an associated computer, such computer employs two network adapters for respectively connecting to the WLAN and the a Wide Area Network (WAN), e.g., the internet. Moreover, such hotspot server would enable free routing to the WAN after successful authentication of a user. However, such standards-based systems are typically not configured to work with third-party payment systems for authentication.

Conventional access points and routers disadvantageously are not configured to facilitate access to data networks, such as the internet, by unregistered or unknown users, with authentication via payment systems generally, or specifically with an advantageous access now, pay later payment system.

SUMMARY OF THE INVENTION

In accordance with a first aspect of the present disclosure, the above identified problems are solved by a novel combination of access points with a unique payment system conceived by an inventor of the present disclosure, which is described in U.S. Patent Publication No. 2012/0166339 A1 to Ene, published Jun. 28, 2012 and entitled "Payment System, Purchasing System, and Method for Performing a Plurality of Payment Processes," which is hereby incorporated by reference in its entirety herein. This publication describes an advantageous exception to known payment systems for purchases of digital content and goods from network-accessible or online merchants. Specifically, in accordance with this publication a buyer making a purchase in an online shop for a certain purchase amount, the payment system will perform the steps of:

(a) storing an identification number of a network-accessible system of a buyer device (the "User Device");

(b) storing the purchase amount in relation to the identification number;

(c) monitoring the total amount of purchases by the User Device;

(d) receiving a request from the online shop to account for the purchase amount; and (e) sending a request for settlement of at least a part of the total amount of purchases to a user of the User Device only when the total amount of purchases exceeds a predefined value and/or after the expiry of a predefined time interval.

A payment system implementing the above method advantageously allows a buyer to make purchases online with a User Device anonymously and pay later. In such a system, a payment system accumulates the amounts of purchases from the User Device and only when the total amount of due payments exceeds a predefined value, the buyer is requested by the payment system to settle the total amount or a part of it. The purchases and purchase amounts are stored by the payment system in relation to a User Device identification which does not include an identification of the buyer nor does it require a registration or any other user interaction by the buyer. The User Device can be a computer, such as a laptop or desktop computer, or mobile computing device, such as a phone or tablet.

In accordance with the present disclosure, modified versions of such a payment system and an access point (or AAA server communicating with one or more access points) provides user devices, which are unknown or unregistered with the access point, access to a data network, such as the internet, subject to a connection fee without requiring users associated with the user devices to register or login to a payment system or otherwise pay in advance. In addition, it is possible to advantageously use a mobile computing device or smartphone operating as, for example, a Wi-Fi hotspot as the access point according to this aspect of the disclosure to enable the owner of such device to derive income from excess data transmission capacity for such a device. Alternatively, such access point or AAA server may advantageously be a wireless router of a small business looking to likewise derive income from excess data transmission capacity.

In accordance with an aspect of the present disclosure, an exemplary payment system advantageously performs the steps of receiving, over a network, from an access point (i) a request by a user device for use of an access point to enable the user device to access a data network via such access point; and (ii) an identifier for the user device; determining, based on the user device identifier, a credit worthiness indicator associated with the user device; transmitting an authorization signal to the access point for the requested data network access by the user device without concurrently requiring payment for the purchases when the creditworthiness indicator satisfies predetermined conditions; monitoring a total outstanding purchase balance associated with the user device; and transmitting a request signal to the access point for communication to the user device for settlement of at least a part of the total outstanding purchase balance associated with the user device identifier if the total outstanding balance exceeds a predetermined threshold amount.

In accordance with another aspect of the present disclosure, an exemplary payment system advantageously performs the steps receiving, over a network, from an access point (i) a request by a user device for use of an access point to enable the user device to access a data network via such access point; and (ii) an identifier for the user device; determining, based on the user device identifier, a credit worthiness indicator associated with the user device; transmitting an authorization signal to the access point for the requested data network access by the user device without concurrently requiring payment for the purchases when the creditworthiness indicator satisfies predetermined conditions; monitoring a total outstanding purchase balance associated with the user device; and transmitting a request signal to the access point for communication to the user device for settlement of at least a part of the total outstanding purchase balance associated with the user device identifier when the total outstanding balance has been accrued over a period of time that exceeds a predetermined limit.

In yet another aspect of the present disclosure, an exemplary access point advantageously performs the steps of registering over a network with a payment system; receiving a connection request signal from the user device for access to the data network by a user device; transmitting to the user device a webpage from a public network address associated with the payment system when the user device is unknown to the access device; receiving a user device identifier from the user device and forwarding the user device identifier to the payment system; receiving from the payment system a signal authorizing access by the user device to the data network; and enabling access to the data network by the user device in response to receiving the authorizing access signal, wherein the authorization signal is received in substantial absence of registration or login to the payment system by a user associated with the user device.

In a further aspect of the present disclosure an \ exemplary access point receives from the payment system a notification that payment for the user device is due, wherein the access point thereafter advantageously provides access to the data network for at least one of a limited duration, limited network addresses and data transmission rates, for enabling the user device to access the payment system network address to settle the payment that is due. In contrast to traditional access points that either block access or provide full access to a data network by user devices. In providing such limited access to the data network, the access point may prevent the user device from accessing particular network addresses included on a blacklist accessible to the access point. Further, in providing such limited access to the data network, the access point may, alternatively or additionally, limit access to the data network to at least one network address of the payment system.

In yet a further aspect of the present disclosure, an exemplary authentication and authorization computer server performs the steps of registering over a network with an authorization system; receiving from a wireless access point a connection request transmitted by a user device to the access point for requesting access to a data network; transmitting to the access point an access challenge signal for corresponding wireless transmission to the user device; receiving a challenge response from the access point received from the user device; instructing the access point to transmit to the user device a webpage from a network address associated with the payment system when the user device is unknown to the access device; receiving from the payment system a signal authorizing access by the user device to the data network; and transmitting a signal to the access point for enabling access to the data network by the user device in response to receiving the authorizing access signal, wherein the authorization signal is received in substantial absence of registration or login to the payment system by a user associated with the user device.

One object of the disclosed systems and methods herein is to enable private individuals and small businesses to employ their broadband internet connectivity for use by unregistered user devices subject to a fee in an access now, pay later manner. Another object of the disclosed systems and methods herein is to combine the access control mechanism of a private or commercially operated Wi-Fi hotspot subject to a connection fee without requiring a user associated with the user device to register or login to a payment system.

This SUMMARY is provided to briefly identify some aspects of the present disclosure that are further described below in the DETAILED DESCRIPTION. This SUMMARY is not intended to identify key or essential features of the present disclosure nor is it intended to limit the scope of any claims.

The term "aspects" is to be read as "at least one aspect." The aspects described above and other aspects of the present disclosure described herein are illustrated by way of example(s) and not limited in the accompanying drawing.

BRIEF DESCRIPTION OF THE DRAWINGS

A more complete understanding of the present disclosure may be realized by reference to the accompanying drawing in which.

DETAILED DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements later developed that perform the same function, regardless of structure.

Unless otherwise explicitly specified herein, the drawings are not drawn to scale.

In the following description, the same reference signs are used for the same and similarly acting parts.

Figure 1:
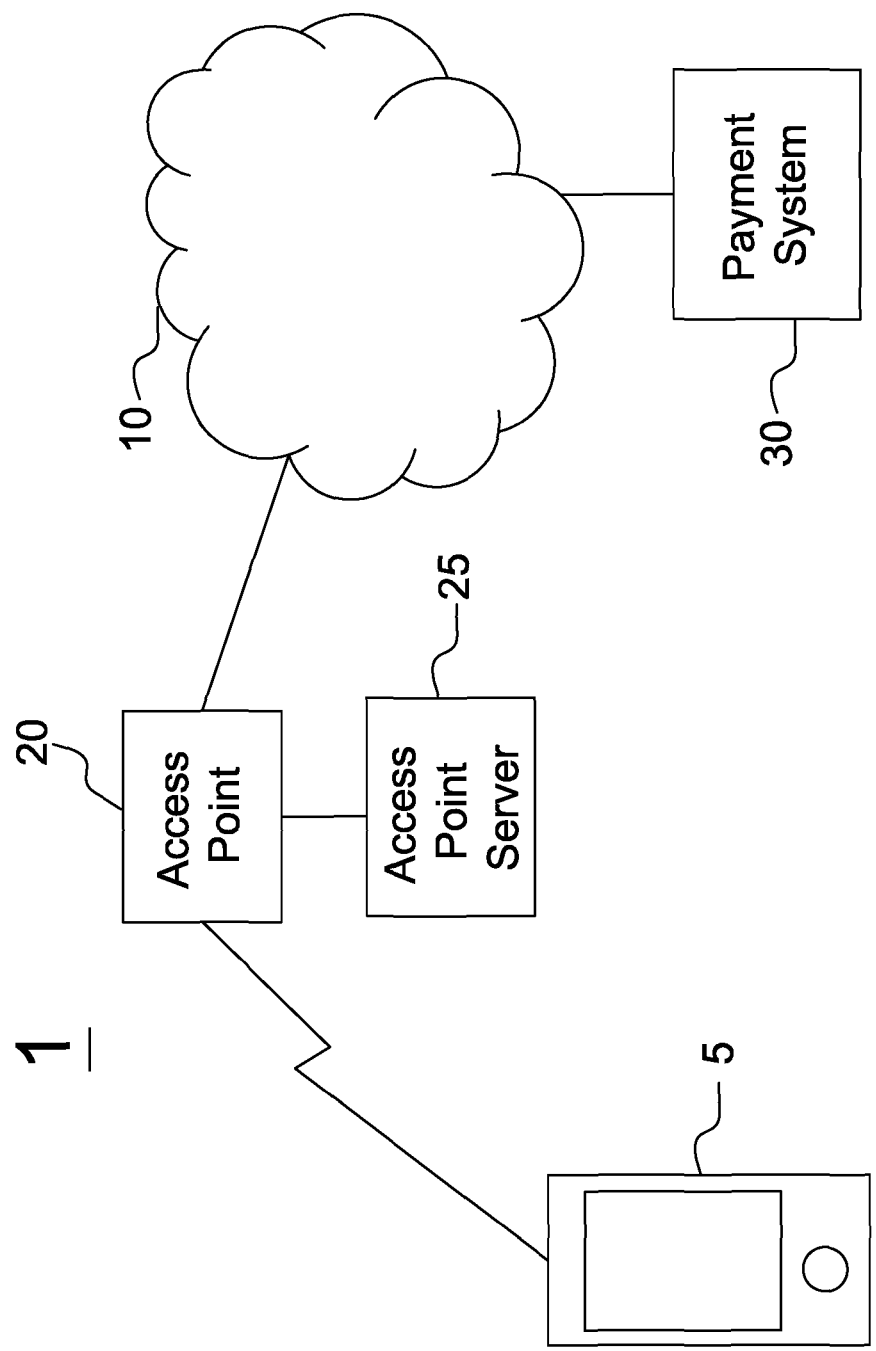
FIG. 1 depicts an exemplary system diagram for enabling a user device access to a data network, such as the internet, via a gateway access point.

FIG. 1 shows an exemplary system 1 for enabling a connection by a wireless user device 5 to a data network 10 such as, for example, the internet, through an access point 20. As used herein, contemplated wireless user devices for user device 5 include laptops, mobile computing devices such as tablets and smartphones or any other device capable of wirelessly communicating with an access point. The access point 20 includes, for example, at least a wireless interface, such as Wi-Fi standard compliant wireless interface for connecting with the user device 5, and a WAN interface for connecting to the data network 10. Suitable devices for access point 20 include, for example, Wi-Fi hotspots, wireless routers including Wi-Fi and mesh network, e.g., Zigbee, routers.

An access point server 25 communicates with and provides authorization control for the access point 20 for authenticating and authorizing user devices, such as the user device 5, requesting access to the data network 10 via the access point 20. Suitable devices for access point server 25 include, for example, hotspot controllers and AAA servers. It should be understood that the access point 20 and access point server 25 functionality may be provided in a single or multiple system components and have been depicted in FIG. 1 as two components for ease of explanation.

Figure 4:
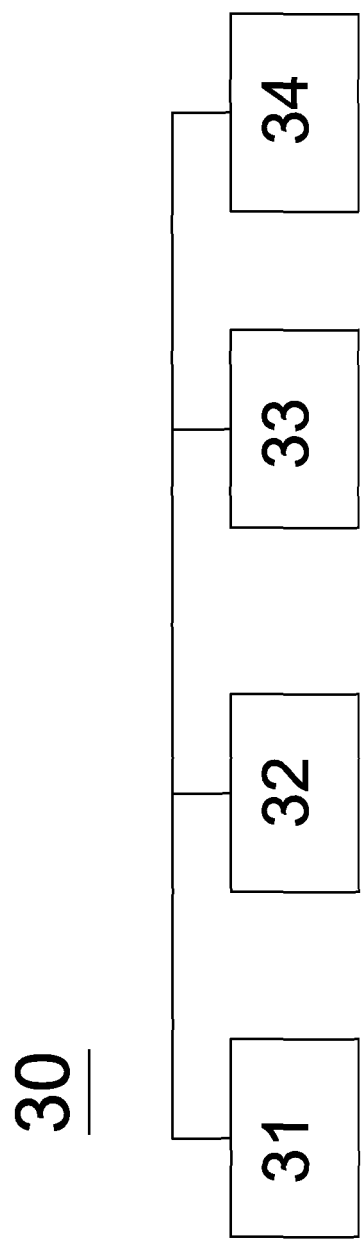
FIG. 4 depicts a block diagram of an exemplary payment system useable with the system of FIG. 1 in accordance with an aspect of the disclosure.

The access point 20 and access point server 25 may communicate with a payment system 30 coupled to the data network 10 for enabling users of user devices, such as the user device 5, to enter a payment arrangement for access to the data network 10 via the access point 20. In conventional systems, the payment system 30 may be a payment system offered by PayPal, Inc. or any number of similar systems offered by banks and credit card companies. However, in accordance with one aspect of this disclosure, the payment system 30 is a payment system that offers a user of the user device 5 the ability to access the data network 10 via the access point 20 now and pay later. FIG. 4 depicts exemplary components of an advantageous payment system as described in the above referenced U.S. Patent Publication No. 2012/0166339 usable in accordance with aspects of the disclosure.

Figure 2:
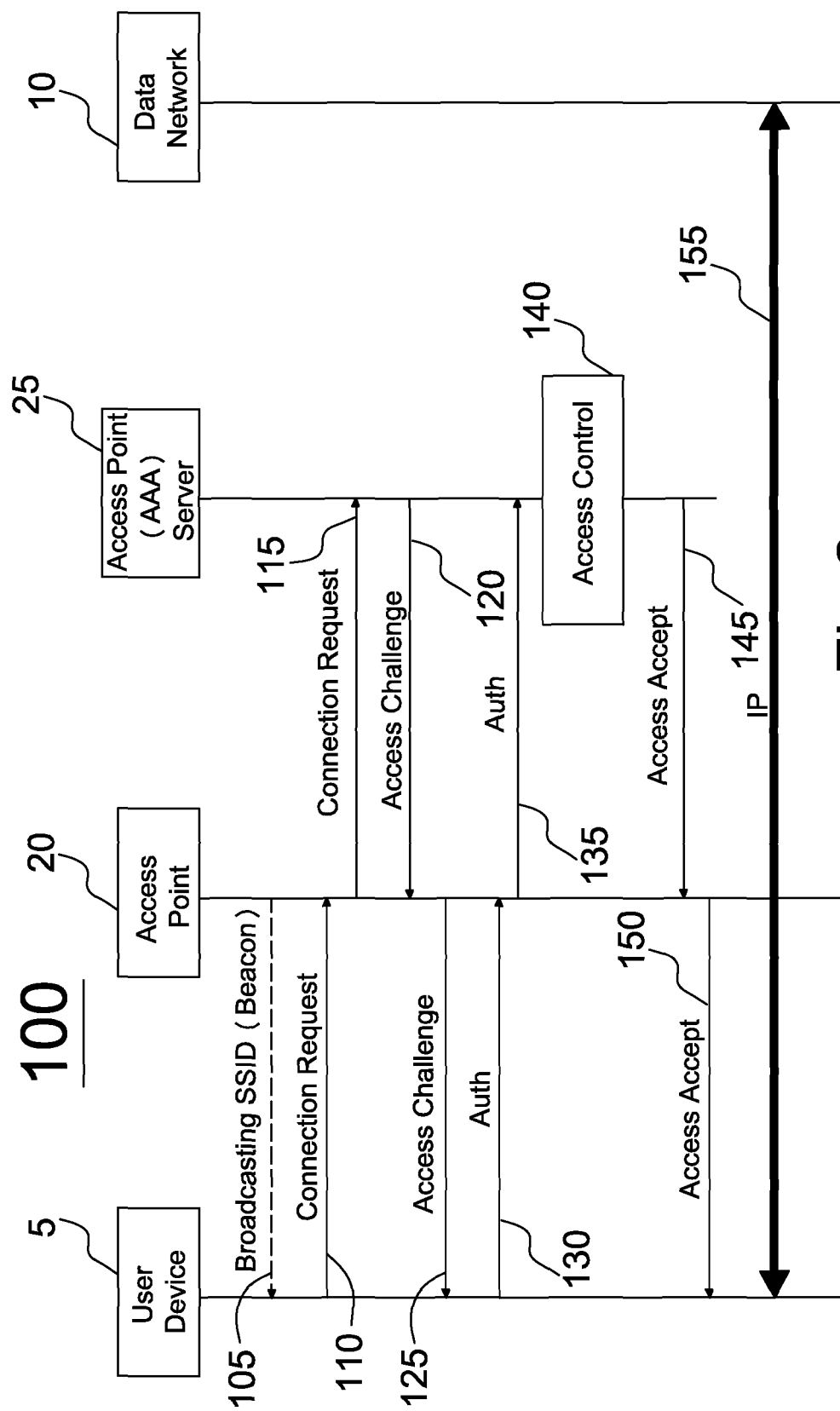
FIG. 2 depicts a flow diagram of a prior art IEEE 802.1X-compliant method for connecting a user device to the data network via an access point.

FIG. 2 depicts a prior art method 100 for the user device 5 to access the data network 10 through the access point 20 of FIG. 1 employing an IEEE 802.1X standard protocol for port-based Network Access Control ("PNAC"). In FIG. 2, the access point 20 broadcasts a service set identifier ("SSID") in step 105. In response and in order to connect to the access point 20, the user device 5 sends a corresponding connection request in step 110. The formats of the SSID and connection request are specified by the IEEE 802.1X standard protocol, which is incorporated herein by reference in its entirety. In step 115, the access point 20 forwards the connection request to the access point server 25 which processes such request using a Remote Authentication Dial-In User Service, IETF RFC 2865 and 2866 ("RADIUS") or IETF RFC-6733 ("Diameter") networking protocols providing centralized authentication, authorization, and accounting management for users connecting to a network and which are incorporated herein by reference in their entirety. In FIG. 2, the access point server 25 is depicted as an AAA server for exemplary purposes only.

In step 120, the AAA server 25 generates and transmits to the access point 20, an Access Challenge signal in accordance with the RADIUS or Diameter protocol. The access point 20, in step 125, correspondingly forwards the information in the Access Challenge signal to the user device 5 in a IEEE 802.1X standard format. Then, in step 130, the user device 5 generates and transmits to the access point 20, a challenge response ("Auth") signal. The access point 20, in turn, forwards the information in the Auth signal to the access point server 25 using the RADIUS or Diameter protocol in step 135, and the access point server 25 performs Access Control operations to verify the information in the Auth signal contains the expected content in step 140. If the server 25 determines that the Auth signal contains the expected content, the server 25 transmits an Access Accept signal via RADIUS or Diameter to the access point 20 in step 145. In response, the access point 20 grants access to the user device 5 and transmits a corresponding notification to the user device 5 in step 150.

The access point 20 thereby establishes an IP connection to enable the user device 5 to transmit and receive information with the data network 10 via the access point 20 as depicted by reference number 155. Such conventional systems 802.1X systems do not contemplate the use of an easy access now and pay later arrangement for the user device 5 to connect to the data network 10.

Figure 3:
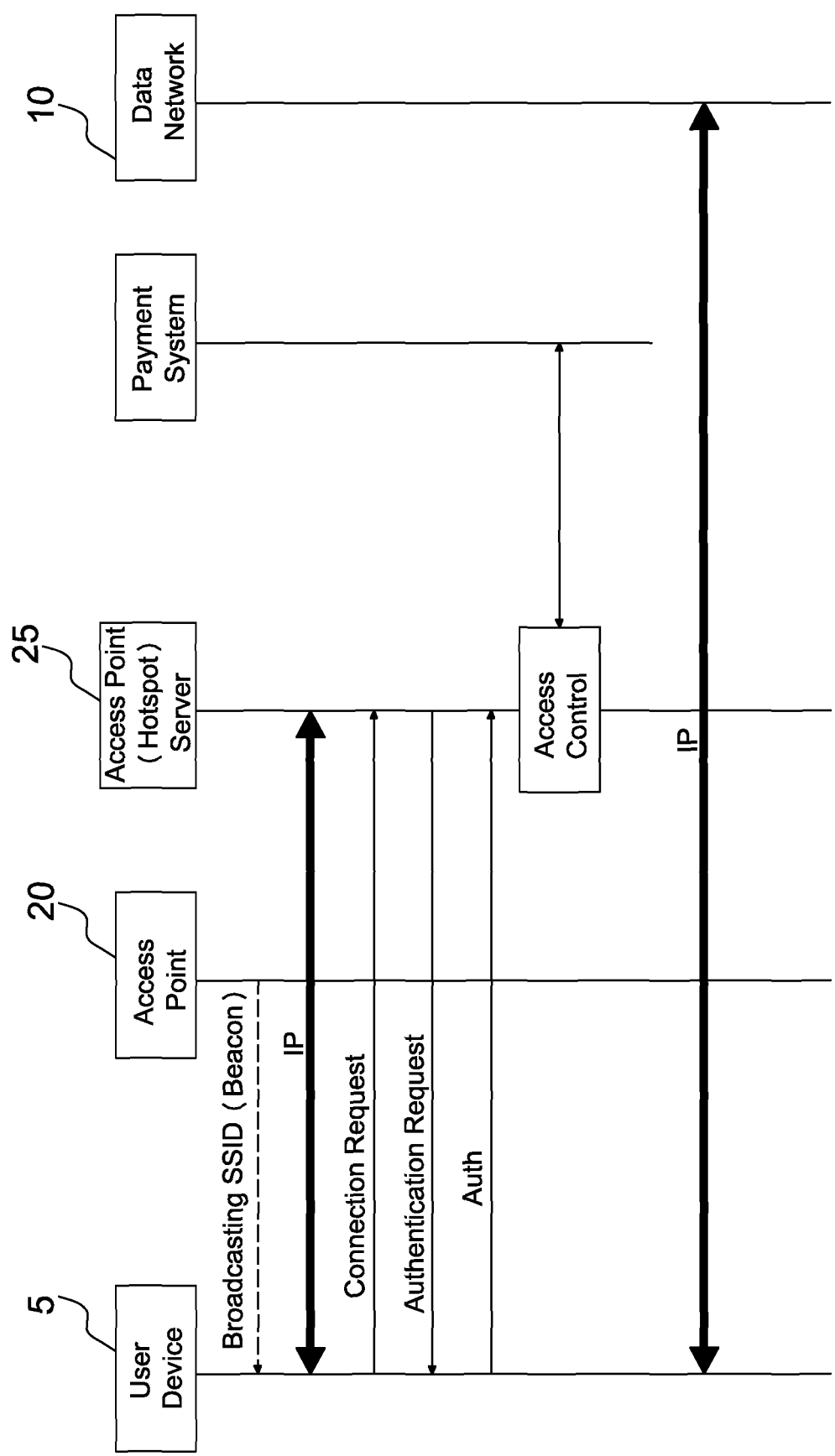
FIG. 3 depicts a flow diagram of a prior art fee-based method for connecting a user device to the data network via an access point and hotspot server.

FIG. 3 depicts a prior art method 200 of a message sequence for the user device 5 to access the data network 10 through the access point 20 of FIG. 1, in the form of a commercial Wi-Fi hotspot. Such as method operates similar to the method 100 of FIG. 2, however, typically, in such a commercial Wi-Fi hotspot system, the access point server 25 in the form of a hotspot server is connected to a local area network ("LAN") that includes the access point 20 and other access points. In such a LAN, the hotspot server 25 communicates with the access point 20 using IP packets in accordance with an IP/TCP/HTTP protocol stack. In such a LAN, the hotspot server 25 may communicate with a conventional payment system 30 such a bank, credit card company or PayPal payment system. If the hotspot server 25 determines that access should be granted to the user device 5 after authentication and optional payment as confirmed by the payment system 30, the hotspot server 25 instructs the access point 20 to enable the exchange of data using the IP protocol between the user device 5 and the data network 10, wherein the access point 20 effectively operates as a router. Unfortunately, such commercial systems are too complex and unwieldly for individuals and small businesses wishing to offer unregistered user devices network access subject to a payment arrangement.

FIG. 4 depicts exemplary components of an advantageous payment system usable as the payment system 30 in FIG. 1 in accordance with aspects of the invention. In FIG. 4, the payment system 30 includes an identification device 31 for recording at least one identifier, i.e., identification number associated with the user device 5 of FIG. 1, an interface device 32 for receiving debit orders and confirming access requests from the access point server 25, wherein the debit orders comprise information relating to a debit amount to be paid, i.e., price for access to the data network 10, to the operators of the access point 20, a memory device 32 for storing the direct debit orders in conjunction with the associated identifier and a processing device 34 for processing the incoming payment transactions.

Figure 5:
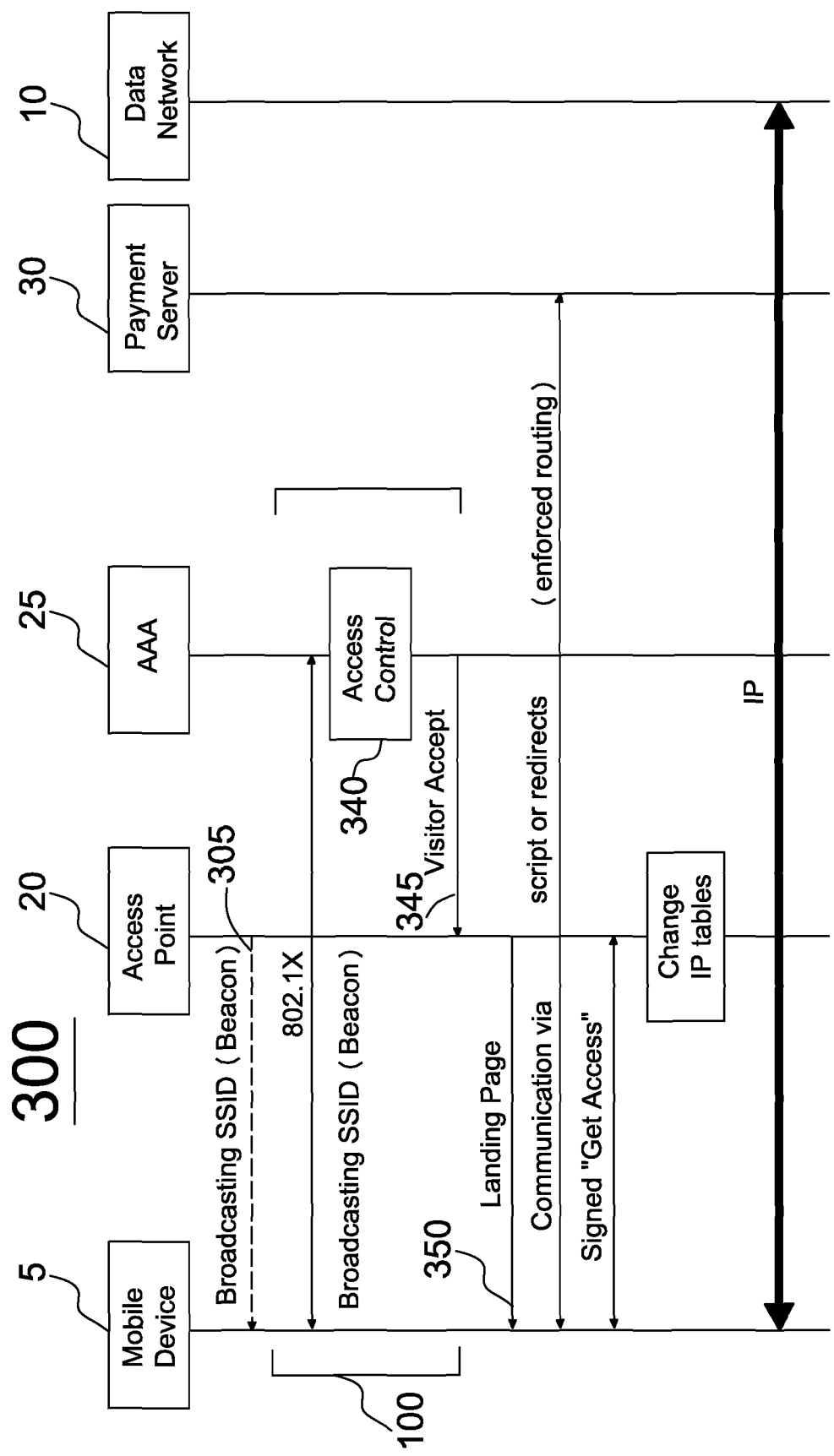
FIG. 5 depicts a flow diagram of an exemplary access point and payment system method in accordance with this disclosure for enabling communication between a user device and the data network.

FIG. 5 depicts a flow diagram of an exemplary access point and payment system method 300 illustrating a message sequence in accordance with one aspect of this disclosure for connecting the user device 5 to the data network 10. In FIG. 5, the access point 20 broadcasts a SSID in step 305. Then, the method 300 may perform a modified version of the method 100 as depicted within the brackets 100', as an optional procedure. In accordance with this modified version of the method 100 of FIG. 2 for a requesting user device seeking a data connection provides a proper authentication response, such as in step 130 of the method 100, the access point server 25, e.g., AAA server, in response transmits to the access point 20 an access accept message in accordance with the RADIUS or Diameter protocols as described with respect to the method 100.

However, in the case the requesting user device seeking a data connection is not registered with the access point server 25, the access point server 25 stores the provided credentials of the requesting user device as a visitor, and the access control procedure 340 in FIG. 5 grants access as if the requesting user device had been a known and/or registered, but transmits a visitor accept message 345 to the access point 20 that is distinguishable from the access accept message 145 in FIG. 2 for a known and/or registered user that would be granted general access to the data network 10. In response to receiving the visitor accept message 345, the access point 20 transmits to the user device 5 webpage information 350 representing a landing page provided by a particular network address. Such access may advantageously be provided for a limited time, for limited web or network addresses and/or limited data transmission rates.

The use by the method 300 of the procedure 100' is optional and the advantageous method 300 may alternatively operate using the method 100 of FIG. 2 for processing known or registered user devices and visitors user devices' requests in seeking access to the data network 10. In such an embodiment of the advantageous method 300, the access point server 25 sends the same access accept message, such as accept message 145 in FIG. 2, independent of whether user device 5 represents a known or registered user, or a visitor. It should be understood that it is beneficial, but not mandatory, to perform the IEEE 802.1X-based procedure 100 or 100' if all requesting user devices will be accepted. The benefit of such procedures advantageously creates encrypted wireless links between the user device 5 and access point 20 and correspondingly inhibiting network spoofing and other security threats in public Wi-Fi usage.

Referring again to the method 300 in FIG. 5, the access point 20 transmits the information for the landing page 350 to the user device 5 after performing the optional authentication procedures 100'. The landing page may be hosted by the access point 20 or provided by a dedicated webserver in the data network 10, including for example, the payment server 30. It is advantageous for the landing page to include software, e.g., HTML code, for requesting authorization of the user device 5 for providing access to the payment system 30 or other payment options. In the instance that the payment system 30 of FIG. 4 is employed in the method 300 of FIG. 5, there are several methods for communicating with the interface device 32 of the payment system 30 including, for example, the following two methods.

Figure 6:
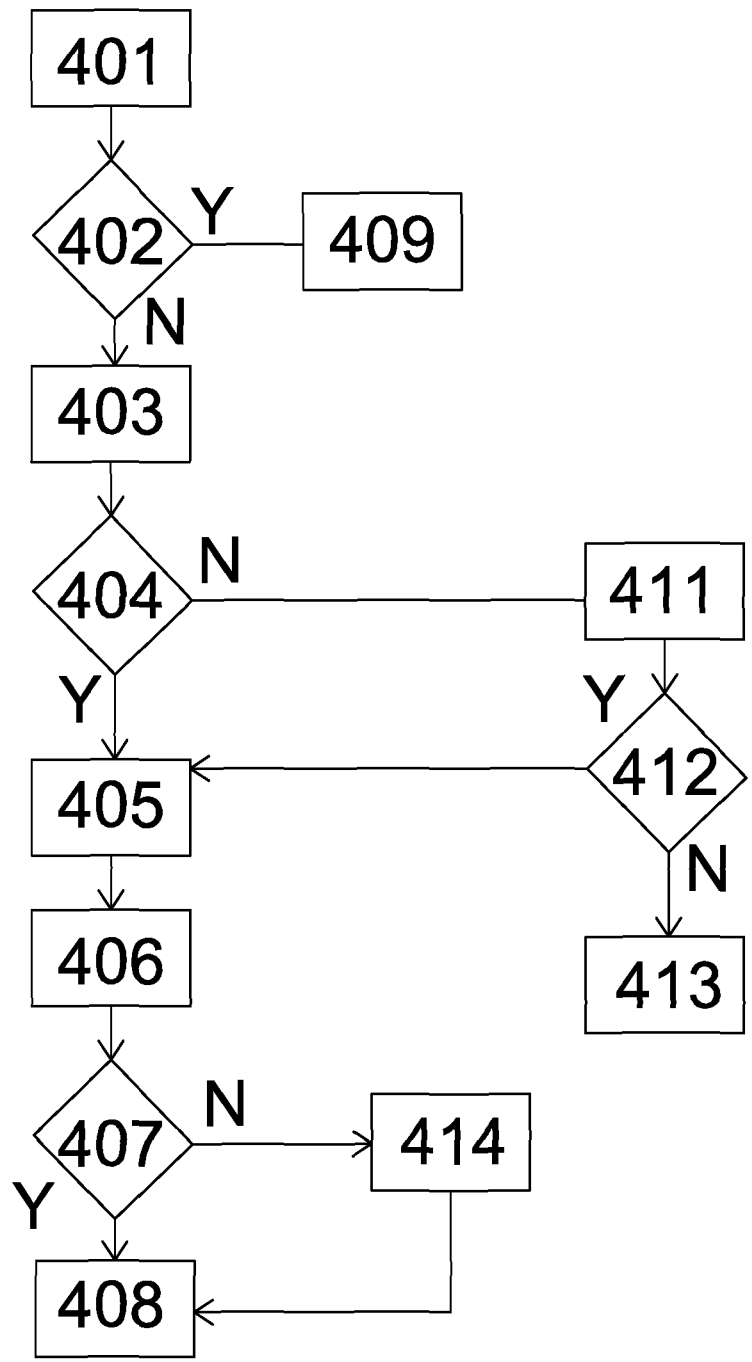
FIG. 6 depicts a flow diagram of an exemplary payment system method in accordance with this disclosure.

In accordance with a first exemplary method as depicted in FIG. 6, in the access point 20 redirecting the web browser of the user device 5 to the payment system 30, the access point 20 includes data parameters as part network address of the payment system 30 for the redirect of, for example, an identifier associated and a network address associated with the access point 20. Such parameters are useful by the payment server 30 after completion of a payment process in issuing a redirect command to the web browser of the user device 5 the from payment server 30 back to the access point 20.

Referring to FIG. 6, in step 401, the payment system 30 records the identifier, e.g., the MAC address of the user device 5 or a previously stored data token in the user device 5 associated with the payment system 30. In step 402, a database check is performed to determine whether the identifier is associated with a user device 5 that should be granted access to the data network 10 via the access point 20 or group of access points comprising an associated system based on a prior payment arrangement in which the user device 5 has previously been granted access based on, for example, a selected access option such as a two-hour, one-day, or a monthly subscription plan. If yes, the payment system 30, in step 409, transmits a signal to the access point 20 indicating that the user device 5 should be provided access to the data network 10 and any limitations in, for example, time or data transmission rate, that is relevant in providing such access.

However, to the extent that the user device 5 does not have valid credentials for access in step 402, the payment system 30 transmits, in step 403, a webpage offering selectable options for the user device 5 to gain access to the data network 10 via the access point 20, such as, for example, options for selected two hours, one day, or a monthly subscription plan, and/or low or high-speed data access bandwidth, and the associated fees for such options. Upon selection by the user device 5 of an access option and an access now and pay later arrangement option, the payment system 30 determines whether the user device 5 is creditworthy in step 404 by, for example, determining a creditworthiness indicator, based on the fee associated with a selected access option. Such determination may be made by, for example, the payment system 30, and by particularly the processing device 34 of FIG. 4, determining whether an account exists for the received identifier of the user device 5.

If a corresponding account exists, it is determined whether debit amounts including the fee for the selected access options have already been added to this account when totaled do not exceed a predetermined amount, e.g., $5.00, or if the oldest debit order was incurred less than a predetermined time period ago, for example, three months. If so, a creditworthiness indicator is generated satisfying a predetermined condition and the payment system 30, in step 405, transmits an authorization signal to the access point 20 indicating that it access point 20 should permit access to the data network 10 by the user device 5 for a specified duration or other limitation for the mobile device.

However, if in step 404, the totaled debit amounts including the fee for the selected access option exceed the predetermined amount or if the oldest debit order was more than a predetermined time interval, the payment system 30 transmits a request to user device 5 for the user to settle at least a portion of the outstanding total amount in step 411. If it is determined in step 412 that the user paid at least a portion of the outstanding total amount, the creditworthiness indicator is generated satisfying the predetermined condition and the payment system 30 transmits, in step 405, an authorization signal to the access point 20 that enables the user device 5 access to the data network 10 through access point 20 for a specified duration or other limitation for the user device 5. Otherwise, the creditworthiness indicator is generated that would not satisfy the predetermined conditions and, in step 413, no authorization signal would be transmitted by the payment system 30 to the access point 20, e.g., transmitting no signal or a not-authorized signal to the access point 20.

For determination of the creditworthiness indicator in step 404, the payment system 30 may additionally verify whether the identifier of the user device 5 is included in a maintained blacklist of identifiers of user devices which, for example, do not register after the predetermined time interval and/or exceed the predetermined total payable without settlement. Such blacklist may include user identifiers of user devices for other reasons including, for example, such identifiers represent stolen user devices, devices located or originated from outside of a specific territory or an embargoed country or region.

Accordingly, if the creditworthiness of the user device 5 is acceptable in step 404, the transmitted authorization signal alerts the access point 20 to enable access by the user device 5 to the data network 10 in step 405. In connection with completion of the process, for example, the access point 20, in step 406, transmits the associated booking in the form of a direct debit order to the payment system 30, e.g., the interface device 32.

Further, in step 407, it is determined whether an account already exists for the user device 5. In effect, it is determined whether an account has already been established by the payment system 30 for the read-out identifier for the user device 5. If no account exists, a suitable account is established in step 414. If an account exists, in step 408, the payment system 30, particularly the memory device 33, stores the direct debit order in conjunction with the identifier for the user device 5.

In accordance with a second exemplary method, instead of the access point 20 redirecting the web browser of the user device 5 to the payment system 30, the access point 20 employs an application programming interface ("API") for the payment system 30 operating on a landing web page provided by the access point 20 or another designated computer server. The specific API interface language employed is not critical to present disclosure, and may include, for example, JavaScript. The data parameters used for the redirect method, e.g., an identifier and a network address associated with the access point 20 are forwarded to the payment server by, for example, a metadata export process implement by execution of such API. In such manner, the API enables the web browser of the user device 5 to communicate with the payment system 30. No other communication channel is required. For privacy concerns, HTTP or flash cookies (generally referred to herein as "cookies") are only readable by the webserver that has stored the cookie. Accordingly, cookies stored on the user device 5 by a script running on the payment system 30 via the API are typically not readable by the access point 20 or other servers.

For such an embodiment employing the API for the payment system 30 operating on a landing web page provided by the access point 20 or another designated computer server, the access point 20 may optionally be in communication with the access point server 25b such as an AAA server using the RADIUS or Diameter protocol. In such a configuration, the AAA server notifies the access point 20 whether the user device 5 is a known or registered user, e.g. an employee, or an unauthenticated user, e.g. a visitor. If the user device 5 has no credentials, it may, for example, choose any username and password or use a default offered by the landing page. The AAA server 25 may then accept the random credentials and stores them for later use. The user device 5 will also store these credentials, so that provision of credentials and the IEEE 802.1X procedure is transparent for the user except for the first access of the user device 5 to the access point 20.

In such an optional embodiment, one or no portion of the credentials (username or password) may be randomly chosen and the remaining portion may be predetermined by an access network operator, in order to limit the guest access to a closed group of visitors. The password in the IEEE 802.1X should not be transmitted over the air in an insecure manner. Instead, for example, a so-called salted hash, i.e., result of a hash function over password and random number divided by a nonce, may be generated and transmitted to the AAA server 25 together with the nonce. In such instance, session keys generated by the AAA server 25 will be user specific, even if all users have to use the exact same credentials. After performing the IEEE 802.1X procedures and establishing encryption between the user device 5 and the access point 20, the access point 20 will be notified that the user device 5 is a visitor and its web browser will be directed to the landing web page. The process of this optional embodiment may be implemented instead of the method depicted within brackets 100' in FIG. 5.

There are several benefits in having an 802.1X access control prior to the landing page including, for example:

(a) IEEE 802.1X offers improved security relative to an open WLAN because IEEE 802.1X ensures that connections to the WLAN access point are secured with connection specific session keys. Specifically, in an open WLAN without security enabled, all IP traffic can undesirably be intercepted, in case there is no additional encryption above IEEE 802.11 in place. Such encryption can be reached, for example, with SSL or by using a VPN but it is not enabled for usual web browsing or over-the-top ("OTT") applications. Even with pre-shared secret based security enabled, an attacker who has knowledge of the passphrase can intercept messages to and from other WLAN clients. Employing IEEE 802.1X ensures that every connection to the WLAN access point is secured with a connection specific session key.

(b) Improved convenience. In particular, user devices typically store valid WLAN credentials. Even with all randomly chosen credentials accepted, the device stores these credentials and will provide them to WLAN access points with the same SSID. Accordingly, every visitor only has to choose credentials randomly at the first time her/his mobile device connects to the WLAN. After such first time, the mobile device will reconnect to any associated access point with the stored credentials without any user interaction.

(c) IEEE 802.1X authentication enables the operator of the access point to readily distinguish between visitors and mobile devices of authenticated users permitting authenticated users access to the data network without user interaction, e.g., without being redirected to the landing page.

(d) Multiple access points may be connected to the same AAA server enabling authentication of credentials of authenticated users, e.g., employees, by such AAA server connected to access points at different company locations.

In accordance with the present disclosure, the access point 20 advantageously may permit limited access by the user device 5 to the data network 10 for the purpose of interacting with the payment system 30. Such limitations may be, for example, limiting the network addresses for which the web browser of the user device 5 may access and download web pages either in the form of a blacklist or specified network addresses that the web browser can access, duration of access to the data network 10, the amount of data download or upload, and/or the permitted data transmission rates for uploads and downloads.

Moreover, for settlement of at least a part of the total amount due in case it exceeds a pre-determined threshold, the user device 5 may need access to further payment systems, e.g. to credit card companies or the like, still without opening the general internet access for the user device 5. As an additional aspect of this invention the payment system 30 may inform the access point 20 of further network addresses or domains that need to be addressed by the user device 5. Alternatively, the payment system 30 informs the access point 20 of network addresses or domains that need forwarding to the payment system 30 which then takes care of providing access to required further payment systems.

As the above exemplary embodiment makes clear, initially, the payment system 30 records the individual direct debit orders for the selected access options as anonymously as possible. The payment system 30 confirms each debit order to the access point 20, such as by, for example, an authorization signal, so that the access point 20 can essentially assume a completed payment. The payment system 30 can identify the user device 5 based on its identifier, e.g., MAC address or cookie.

In the payment system 30 of FIG. 4, the memory device 33 thus stores the direct debit orders for access in conjunction with the corresponding identifier. For this purpose, the payment system 30 comprises a corresponding database for each mobile device identifier in which corresponding tables are kept. An exemplary table may effectively be organized into, for example, three columns respectively containing (i) the identification of a particular direct debit order for access, (ii) the amount to be debited and (iii) the date on which the direct debit order was received by the payment system 30.

In the exemplary method of FIG. 6 described above, in step 404, it is checked whether the user device 5 has already amassed a total payable that is greater than the exemplary threshold value of $5.00. In addition, the processing device 34 of FIG. 4 can check in step 404 whether the user device 5 has used the payment system 30 for longer than a particular predetermined time interval. For example, the processing device 34 can check whether the first direct debit order of a particular identification number ID is older than three months. The payment system 30 may also be configured such that said system offers the user of the user device 5 the possibility to settle his amassed direct debit orders at any time. Preferably, the user is encouraged, by the offering of rebates, to make his actual payment to the payment system 30 at as early a time point as possible.

The payment system 30 may also comprise an account monitoring device which monitors actual incoming payments, and credits them to a user device 5. For example, a registration according to aspects of this disclosure invention can take place therein wen the user enters a user name. In exchange, the payment system 30 shows him an account number and requests him to transfer the total payable to the corresponding account, stating his user name. The transferred amount is then credited to the account of the user device 5.

In the exemplary embodiments described above, an MAC address was used to identify the user device 5. It should be obvious for a person skilled in the art that, in place of the MAC address, an IP address, a cookie, an identification number of an operating system, an identification number of a processor or other identification numbers that give access to the identity of the user device 5 may be used. It is also theoretically possible to use a plurality of these identification numbers ID in order to increase the reliability of the payment system 30. Furthermore, it is possible to use just parts of the identification numbers to generate a unique key which identifies the user device 5 shopper system 10.

As indicated above, the user device 5 can uniquely assigned a identifier by means of a digitally signed cookie, which is likewise useable for corresponding database entries in the payment system 30. The signed data can comprise a combination value formed from all the previously known user data in order to make misuse more difficult. The cookie can be stored using a plurality of techniques on the user device 5 (e.g. as a HTTP or Flash Cookie) and thus, as far as possible, be secured against later deletion. If, on a later contact with the payment system 30, the cookie is deleted in a cookie store, it can be created anew. The cookie can also comprise a parameter which states whether the user device 5 is already registered or logged in. The user device 5 can log into an interface of the payment system 30 at any time in order to inspect his account information.

In a further embodiment of the disclosure, the payment system 30 may use a code provided by the user device 5, or the user by way of the user device 5, in order to identify himself to the payment system. The code may serve as an identification number ID and be used in place of a hardware identification number. It is also conceivable that the code input for the above-mentioned identification numbers ID, for example, a requested hardware identification number, is used. The code may be, for example, an IMSI (International Mobile Subscriber Identity). The user of the user device 5 enters the IMSI of his mobile telephone and the payment system 30 establishes an account relating thereto or adds the debit amounts to the existing account. The payment system 30 may verify the correctness of the code given—that is, the IMSI—in that said payment system 30 sends a message, for example, by SMS (Short Message Service) to the user device 5. The payment system 30 may then request the user to confirm receipt of the message, for example, by returning the message or input of a code, wherein use of the payment system 30 is prohibited if the message is not confirmed. Said verification may only take place once, preferably on establishment of the account, or at every payment transaction.

In order to mitigate risk of non-paying users (for example: a user uses the payment system 30 until he is requested to settle his debts. He then fails to settle his debts, but dispenses with further use of the payment system 30), the payment system 30 may comprise an evaluation device for contributing to and/or generation of the creditworthiness indicator. Said evaluation device records statistical data concerning the direct debit orders and/or the identification numbers ID issued, preferably continuously. Further data which provide information concerning the type of purchases made and/or the location of the user may be recorded and evaluated. For example, the IP address of the user may be used in order to determine roughly his location. Furthermore, using the IP address of the internet providers used by the user, an individual with RIPE responsibility or the like may be determined. The evaluation device may use the collected statistical data to adapt the payment threshold.

For example, a user to whom, on the basis of his mobile device IP address, a group having statistically-good creditworthiness is assigned, can undertake direct debit orders until his account has a negative balance of more than $5.00, whereas a user to whom, on the basis of his IP address, a group having poor creditworthiness is assigned, can only undertake direct debit orders up to a total payable of $1.00. Further, the payment system 30 can entirely prevent a debit before the registration if the user device is assigned to a group with very poor creditworthiness. The statistics are maintained by the evaluation device, preferably in a database, and can be analyzed accordingly on first contact with the user, and used for determination of the creditworthiness indicator.

As explained above, the identifier may at least partially comprise or be derived from data stored in a cookie and kept in the user device 5. Preferably, the relevant data are stored multiple times on the user device 5, in order to prevent deletion of said data. For example, a plurality of cookies may be stored in the user device 5, wherein a first cookie is stored therein directly by the payment system 30 and a second cookie is stored there by means of the access point 20. The payment system 30 may thus request the identifier directly from the user device 5 and compare the requested value with a value provided by the access point 20. In order to increase security and anonymity, the identifier may be made available to the access point 20 in an encoded form, so that it is not possible for the access point 20 to make a direct allocation of the user to a particular identifier. As soon as the user device attempts access via the same access point 20 again, the access point 20 requests the identifier and passes said number on to the payment system 30. The user device 5 may also be directed to a webpage of the payment system 30, said webpage requesting the further cookie with a further, or the same, identifier.

For a person skilled in the art in this field, it should be obvious that there are further possibilities for allocating the identifier to the user device 5. For example, the communication protocols on which the internet is based can be amended such that said protocols permit unambiguous conclusions about the shopper system used. Commonly used browsers employ caching of the requested web sites in order to be able to access said web sites rapidly and easily. It is necessary to provide individually cached elements with a (web) identifier so that on renewed call-up of a site by the user device 5, an updated version of the object provided with the identifier is requested. This request enables the payment system 30 to identify the user device 5 uniquely. URLs can also be modified so that said URLs give the identifier ID or a portion thereof.

The disclosed payment service was described with the functions of the payment system 30 separate from the functions of the access point 20. However, it readily should be understood that such payments systems may be incorporated into the operations of the access point or associated access point server.

The invention is further described by the following numbered paragraphs:

1. A computer-implemented method for a payment system comprising the steps of:
    a. receiving, over a network, from an access point (i) a request by a user device for use of an access point to enable the user device to access a data network via such access point; and (ii) an identifier for the user device;
    b. determining, based on the user device identifier, a credit worthiness indicator associated with the user device;
    c. transmitting an authorization signal to the access point for the requested data network access by the user device without concurrently requiring payment for the purchases when the creditworthiness indicator satisfies predetermined conditions;
    d. monitoring a total outstanding purchase balance associated with the user device; and
    e. transmitting a request signal to the access point for communication to the user device for settlement of at least a part of the total outstanding purchase balance associated with the user device identifier if the total outstanding balance exceeds a predetermined threshold amount.
2. The computer implemented method of paragraph 1 further comprising registering the access point for use of services offered by the payment system.
3. The computer implemented method of paragraph 1 further comprising receiving communication from the user device for settlement via the access point.
4. The computer implemented method of paragraph 3 wherein the access point is enabling limited access to the data network for the communication for settlement, wherein such limited access is at least one of limited access to at least one network address associated with the payment system, limited duration of access, and limited data transmission rate.
5. The computer implemented method of paragraph 1 wherein the determining step comprises the step of determining whether the user device identifier is included in a maintained list of identifiers.
6. The computer implemented method of paragraph 5 wherein the maintained list of identifiers includes uncreditworthy identifiers.
7. The computer-implemented method of paragraph 1 wherein the authorization signal is generated in substantial absence of registration or login to the payment system by a user associated with the user device.

8. The computer-implemented method of paragraph 1 wherein the authorization signal is generated in substantial absence of identifying a user associated with the user device.

9. The computer-implemented method of paragraph 1 wherein the step of transmitting the authorization signal is made in substantial absence of receipt of payment for any portion of the total outstanding purchase balance associated with the user device identifier.

10. The computer-implemented method of paragraph 1 wherein the user device identifier is based on at least one of a MAC address of the user device and a HTTP cookie stored in the user device.

11. The computer-implemented method of paragraph 1 wherein the payment system and the access point comprise a common system.

12. The computer-implemented method of paragraph 1 further comprising routing information between the data network and the access point on behalf of the user device through the payment system.

13. A computer-implemented method for a payment system comprising the steps of:
   a. receiving, over a network, from an access point (i) a request by a user device for use of an access point to enable the user device to access a data network via such access point; and (ii) an identifier for the user device;
   b. determining, based on the user device identifier, a credit worthiness indicator associated with the user device;
   c. transmitting an authorization signal to the access point for the requested data network access by the user device without concurrently requiring payment for the purchases when the creditworthiness indicator satisfies predetermined conditions;
   d. monitoring a total outstanding purchase balance associated with the user device; and
   e. transmitting a request signal to the access point for communication to the user device for settlement of at least a part of the total outstanding purchase balance associated with the user device identifier when the total outstanding balance has been accrued over a period of time that exceeds a predetermined limit.

14. The computer implemented method of paragraph 13 further comprising registering the access point for use of services offered by the payment system.

15. The computer implemented method of paragraph 13 further comprising receiving communication from the user device for settlement via the access point.

16. The computer implemented method of paragraph 15 wherein the access point is enabling limited access to the data network for the communication for settlement, wherein such limited access is at least one of limited access to at least one network address associated with the payment system, limited duration of access, and limited data transmission rate.

17. The computer implemented method of paragraph 13 wherein the determining step comprises the step of determining whether the user device identifier is included in a maintained list of identifiers.

18. The computer-implemented method of paragraph 17 wherein the maintained list of identifiers includes uncreditworthy identifiers.

19. The computer-implemented method of paragraph 13 wherein the authorization signal is generated in substantial absence of registration or login to the payment system by a user associated with the user device.

20. The computer-implemented method of paragraph 13 wherein the authorization signal is generated in substantial absence of identifying a user associated with the user device.

21. The computer-implemented method of paragraph 13 wherein the user device identifier is based on at least one of a MAC address of the user device and a HTTP cookie stored in the user device.

22. The computer-implemented method of paragraph 13 wherein the step of transmitting the authorization signal is made in substantial absence of receipt of payment for any portion of the total outstanding purchase balance associated with the user device identifier.

23. The computer-implemented method of paragraph 13 wherein the payment system and access point comprise a common system.

24. The computer-implemented method of paragraph 13 further comprising routing information between the data network and the access point on behalf of the user device through the payment system.

25. A method for a wireless access point comprising the steps of:
   a. registering over a network with a payment system;
   b. receiving a connection request signal from the user device for access to the data network by a user device;
   c. transmitting to the user device a webpage from a public network address associated with the payment system when the user device is unknown to the access device;
   d. receiving a user device identifier from the user device and forwarding the user device identifier to the payment system;
   e. receiving from the payment system a signal authorizing access by the user device to the data network; and
   f. enabling access to the data network by the user device in response to receiving the authorizing access signal, wherein the authorization signal is received in substantial absence of registration or login to the payment system by a user associated with the user device.

26. The method of paragraph 25 further comprising the step of transmitting a wireless signal capable of receipt by user devices indicating that the wireless access point is available, subject to a payment arrangement fee, for connecting to a data.

27. The method of paragraph 25 wherein the step of enabling access to the data network is for a predetermined time period.

28. The method of paragraph 25 wherein the step of enabling access to the data network to said user device occurs based on the authorization signal in substantial absence of receipt of payment.

29. The method of paragraph 25 wherein the authorization signal is received in substantial absence of identifying to the payment system a user associated with the user device.

30. The method of paragraph 25 wherein the user device identifier is based on at least one of a MAC address of the user device and a HTTP cookie stored within the user device.

31. The method of paragraph 25 further comprising the step of receiving information from the payment system indicative of whether the user device is known.

32. The method of paragraph 25 wherein the enabling step comprises enabling access to at least one particular predetermined network addresses of the data network.
33. The method of paragraph 32 wherein the enabling step comprises enabling access to the data network through the network address of the payment system.
34. The method of paragraph 25 further comprising the steps of receiving from the payment system a notification that payment for the user device is due and, prior to receiving the signal authorizing access, enabling limited access to the data network to enable the user device to access the payment system network address to settle at least a portion of the payment that is due.
35. The method of paragraph 34 wherein the limited access is lat least one of limited access to at least one network address of the payment system, limited duration of access, and limited transmission rate.
36. The method of paragraph 25 further comprising the steps of preventing the user device to access a network address included on a blacklist accessible to the access point.
37. The method of paragraph 25 wherein the access point is a Wi-Fi hotspot.
38. The method of paragraph 37 wherein the Wi-Fi hotspot is a personal communications device.
39. A computer-implemented method for an authentication and authorization computer server comprising the steps of:
   a. registering over a network with a payment system;
   b. receiving from a wireless access point a connection request transmitted by a user device to the access point for requesting access to a data network;
   c. transmitting to the access point an access challenge signal for corresponding wireless transmission to the user device;
   d. receiving a challenge response from the access point received from the user device;
   e. instructing the access point to transmit to the user device a webpage from a network address associated with the payment system when the user device is unknown to the access device;
   f. receiving from the payment system a signal authorizing access by the user device to the data network; and
   g. transmitting a signal to the access point for enabling access to the data network by the user device in response to receiving the authorizing access signal, wherein the authorization signal is received in substantial absence of registration or login to the payment system by a user associated with the user device.
40. The method of paragraph 39 wherein the step of transmitting a signal to the access point for enabling access to the data network by the user device further comprises information in such signal to establish encryption for data transmitted to and from the user device.
41. The method of paragraph 40 wherein the encryption is established based on at least information in the challenge response.
42. The method of paragraph 40 wherein the encryption is established based on credentials of the wireless radio interface for the challenge response.
43. The method of paragraph 39 wherein the step of enabling access to the data network is for a limited time period.
44. The method of paragraph 39 wherein the step of enabling access to the data network to said user device occurs based on the authorization signal in substantial absence of receipt of payment for the fee.
45. The method of paragraph 39 wherein the authorization signal is received in substantial absence of identifying to the payment system a user associated with the user device.
46. The method of paragraph 39 wherein the user device identifier is based on at least one of a MAC address of the user device and a HTTP cookie stored within the user device.
47. The method of paragraph 39 further comprising the step of receiving information from the payment system indicative of whether the user device is known.
48. The method of paragraph 39 wherein the enabling step comprises enabling access to particular predetermined data network addresses.
49. The method of paragraph 39 wherein in the authentication and authorization computer server and access point comprise a common system.
50. The method of paragraph 39 wherein the step of enabling access to the data network is for a predetermined time period.
51. The method of paragraph 39 wherein the access point is a Wi-Fi hotspot.
52. The method of paragraph 51 wherein the Wi-Fi hotspot is a personal communications device.
53. The method of paragraph 39 further comprising the steps of receiving from the payment system a notification that payment for the user device is due and, prior to receiving the signal authorizing access, enabling limited access to the data network to enable the user device to access the payment system network address to settle at least a portion of the payment that is due.

What is claimed is:

1. A method for a wireless access point to provide access to a data network for a user device without registering a user of the user device to the access point by an access point server configured for authenticating and authorizing user devices requesting access to the data network, comprising the steps of:
   registering the access point over the data network with a payment system;
   receiving a connection request signal at the access point server from the user device requesting access to the data network via the access point;
   receiving a user device identifier at the access point server from the user device;
   determining at the access point server that the user of the user device is unknown-registered to the access point;
   transmitting a visitor accept message to the access point by the access point server when the user of the user device is not registered to the access point;
   redirecting a web browser of the user device in response to receiving the visitor accept message by the access point to a public network address associated with the payment system, wherein the access point includes as part of the public network address an identifier associated with, and a network address associated with, the access point, and wherein access to the payment system for the user device provided by the access point is a limited access limited to one or more webpages of the payment system;
   receiving an authorization signal at the access point from the payment system via the data network, the authorization signal authorizing the user device to access the data network in accordance with an access option that is authorized by the payment system and provides a broadened access that includes at least one particular predetermined network address of the data network in addition to the one or more webpages of the payment system;

enabling access by the access point for the user device to access the data network by according to the access option, wherein the authorization signal is received in substantial absence of registration or login to the payment system by the user associated with the user device; and responding to a redirect command issued to the web browser of the user device from the payment system back to the access point using the identifier and network address associated with the access point.

2. The method of claim 1 further comprising the step of transmitting a wireless signal capable of receipt by user devices indicating that the wireless access point is available, subject to a payment arrangement fee, for connecting to a data network.

3. The method of claim 1 wherein the step of enabling access occurs based on the authorization signal in substantial absence of receipt of payment by the payment system.

4. The method of claim 1 wherein the authorization signal is received in substantial absence of identifying to the payment system a user associated with the user device.

5. The method of claim 1 wherein the user device identifier is based on at least one of a MAC address of the user device and a HTTP cookie stored within the user device.

6. The method of claim 1 wherein one or more of the limited access or the broadened access are subject to at least one of a limited time or a limited data transmission rate.

7. The method of claim 1 further comprising the steps of:
receiving from the payment system a notification that payment for the user device is due, and
prior to receiving the signal authorizing the user device to access the data network according to the requested access option, providing the user device with a limited access to the data network to access the payment system network address to settle at least a portion of the payment that is due.

8. The method of claim 7 wherein the access option provides at least one of limited access, limited duration of access, and limited transmission rate to the data network.

9. The method of claim 1 wherein the access point is a Wi-Fi hotspot.

10. The method of claim 9, wherein the Wi-Fi hotspot is a personal communications device.

11. The method of claim 1, wherein the authorization signal indicates that access is limited to a limited duration of access or a limited data transmission rate.

12. The method of claim 1, wherein the payment system comprises a payment server.

* * * * *